April 1, 1941.  L. S. HAMER  2,236,873
FLOW CONTROLLING DEVICE
Filed April 4, 1939   2 Sheets-Sheet 1
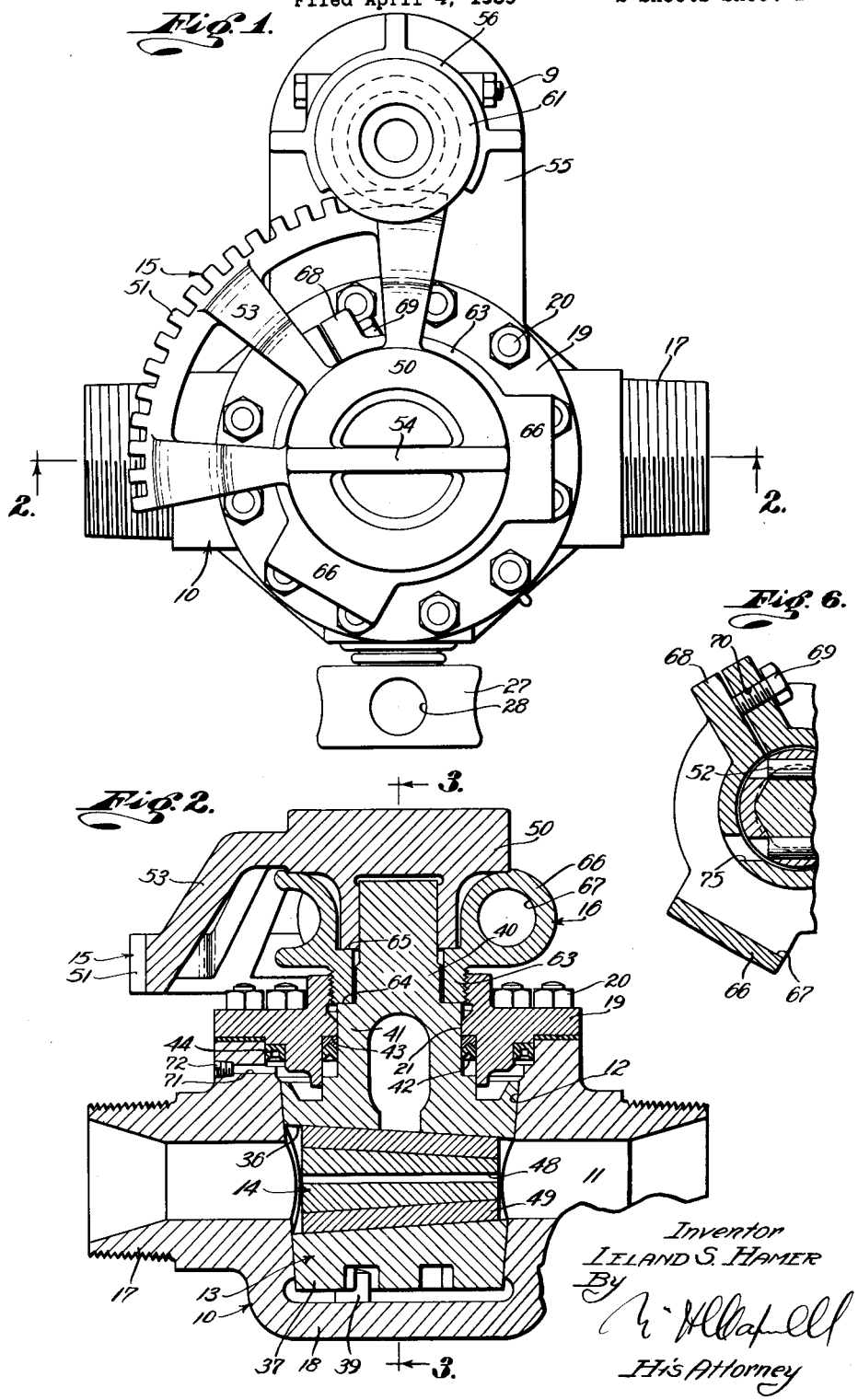
Inventor
LELAND S. HAMER
By
His Attorney April 1, 1941. L. S. HAMER 2,236,873
FLOW CONTROLLING DEVICE
Filed April 4, 1939 2 Sheets-Sheet 2
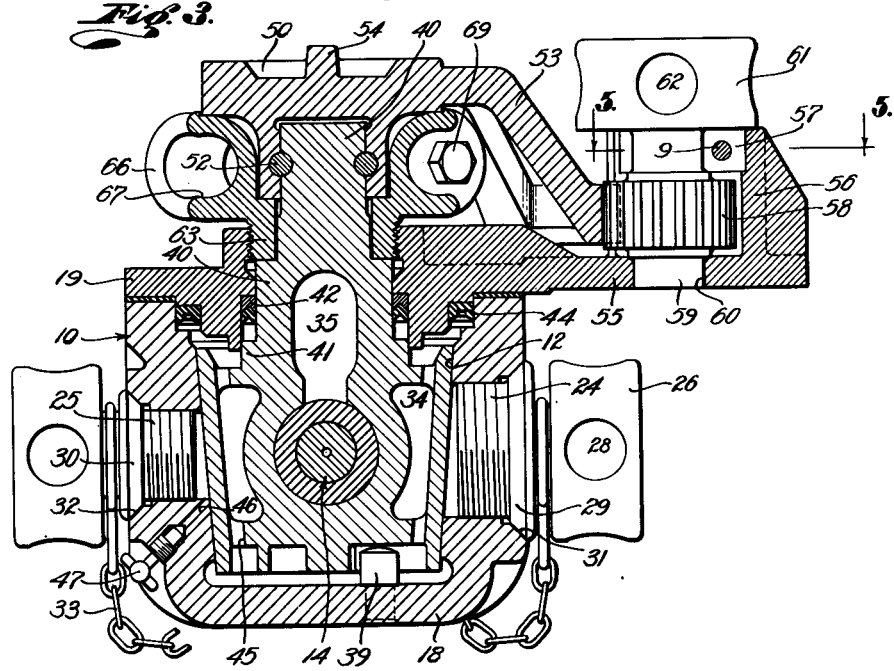
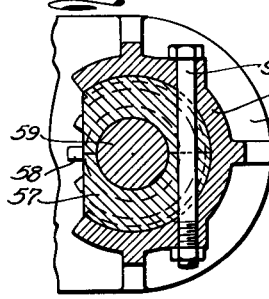
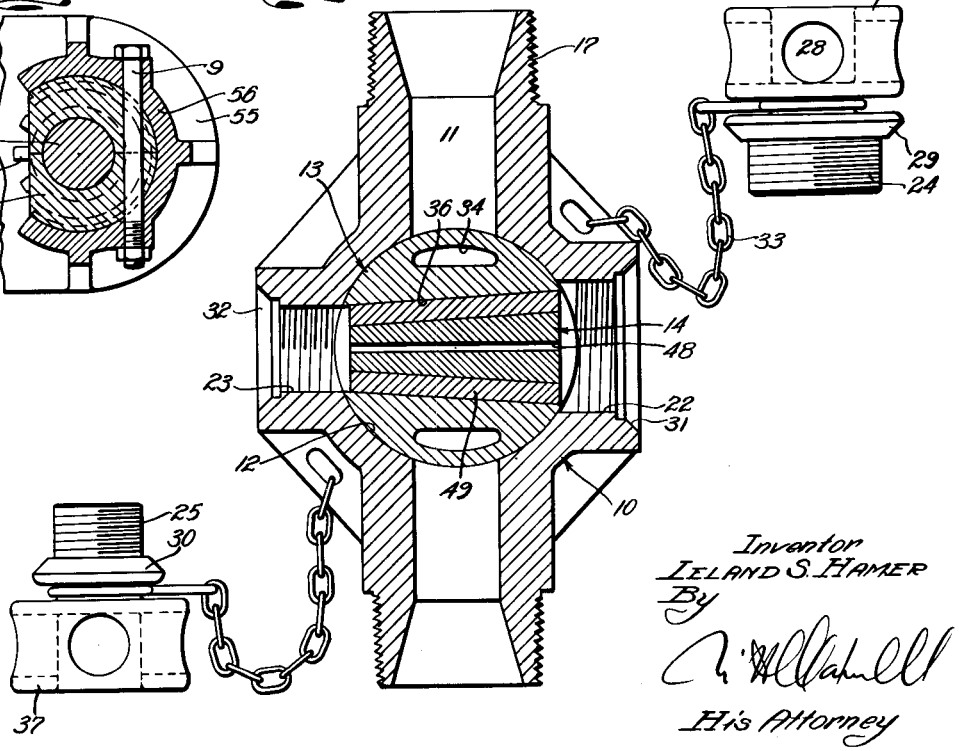
Inventor
Leland S. Hamer
By
His Attorney Patented Apr. 1, 1941

2,236,873

UNITED STATES PATENT OFFICE 2,236,873

FLOW CONTROLLING DEVICE

Leland S. Hamer, Long Beach, Calif.

Application April 4, 1939, Serial No. 265,926

4 Claims. (Cl. 251—97)

This invention relates to valve devices and flow controlling devices for handling fluid under pressure. A general object of this invention is to provide a practical, dependable and easily operated flow bean or flow controlling device.

Where fluid is handled at high pressures it is sometimes necessary to control or restrict the flow by means of devices known as flow beans. For example, the fluid flowing from oil wells is often under very high pressures and the fluid conductors at the mouths of the wells must be provided with flow beans to bean or restrict the flow.

The present invention is embodied in a flow bean of the character referred to above and embodies certain features and elements applicable to valves of the stop cock and plug valve class. I will herein refer to the device of the invention as a flow bean, it being understood that this reference is not to be taken as a restriction on the applicability of the invention insofar as its valve or stop cock features are concerned.

Another object of this invention is to provide a flow bean embodying a removable bean and a turnable plug carrying the bean and operable to positively close off the flow of fluid when the bean is to be replaced, thus eliminating the necessity of providing a valve in the line to cut off the flow when the bean requires replacement.

Another object of this invention is to provide a flow bean capable of handling fluids under very high pressures without leaking, failing, or sticking.

Another object of this invention is to provide a flow bean embodying a removable bean or flow restricting member that may be easily and quickly replaced with no appreciable loss of fluid and while the device is under high pressure.

Another object of this invention is to provide a flow bean embodying a turnable plug carrying the flow restricting bean and novel means capable of applying great force to turn the plug between the normal position and a position where the flow through the device is cut off and the bean is made easily accessible for immediate removal and replacement.

Another object of this invention is to provide a flow bean of the character mentioned in which the plug turning means has a high mechanical advantage and may be easily operated to turn the plug under any pressure condition.

Another object of this invention is to provide a flow bean of the character mentioned in which the plug may be urged inwardly and held in tight sealing cooperation with the wall of the body to positively prevent leakage around the plug and may thereafter be freed or elevated for easy turning between the active position and the position where the bean may be removed for replacement.

An important object of this invention is to provide a flow bean of the character mentioned in which the plug turning means and the plug setting and elevating means are structurally and operatively related in such a manner that the plug may be maintained in tight effective sealing cooperation with the body plug and yet may be easily and positively turned between the normal position and the bean changing position while subjected to high fluid pressures.

Another object of this invention is to provide a flow bean embodying novel effective means for removably securing the replaceable bean in the plug.

A further object of this invention is to provide a flow bean of the character mentioned in which the fluid pressures on the plug are substantially equalized.

The various objects and features of my invention will be fully understood from the following detailed description of a typical preferred form and application of the invention, throughout which description reference is made to the accompanying drawings, in which:

Fig. 1 is a plan view of the improved flow bean provided by this invention. Fig. 2 is a longitudinal detailed sectional view taken as indicated by line 2—2 on Fig. 1 showing the plug and bean in the normal positions. Fig. 3 is a vertical detailed sectional view taken as indicated by line 3—3 on Fig. 2. Fig. 4 is a horizontal detailed sectional view of the device with the bean in position for removal, and the plugs unthreaded to render the bean accessible. Fig. 5 is an enlarged fragmentary horizontal detailed sectional view taken substantially as indicated by line 5—5 on Fig. 3, and Fig. 6 is an enlarged fragmentary horizontal detailed sectional view illustrating the nut spreading means.

The improved flow bean of the present invention may be said to comprise, generally, a body 10 having a fluid passage 11 and an opening 12 intersecting the passage 11, a turnable plug 13 in the opening 12, a replaceable bean 14 carried by the plug 13 to restrict the flow of fluid through the passage 11, gear means 15 for turning the plug 13 and means 16 acting on the plug 13 to urge the same axially in the opening 12.

The body 10 is adapted to be applied to or connected in a fluid handling conduit. In practice the body 10 may be connected in the pipe or conduit in any suitable manner. In the case illustrated external or male threads 17 are provided on opposite sides of the body 10 for connection with pipe parts. The threads 17 are on parts of the body 10 surrounding the opposite end portions of the fluid passage 11 so that the passage may directly communicate with the pipe parts. It is apparent that the opposite end portions of the passage 11 may be internally threaded, flanged or otherwise conditioned for connection with the pipe parts. The passage 11 is preferably a straight, cylindrical bore, as illustrated. The opening 12 enters what may be considered the upper end of the body 10 and extends at right angles to the passage 11 to intersect the passage. The lower end of the opening 12 is closed by an integral body wall 18. In accordance with the invention the opening 12 is tapered having a downwardly and inwardly convergent wall. The upper portion of the opening 12 may be cylindrical and of enlarged diameter. A cap or head 19 is secured to the upper end of the body 10 by studs or screws 20 and extends inwardly over the upper end of the opening 12. The head 19 is thickened to extend downwardly in the opening 12 and has a central vertical opening 21.

The body 10 is provided with a pair of diametrically opposite openings 22 and 23 communicating with the tapered opening 12. The common axis of the openings 22 and 23 lies in a plane at right angles to the plane occupied by the longitudinal axis of the fluid passage 11. The openings 22 and 23 are provided to make the bean 14 accessible for removal when the plug 13 is turned to the position illustrated in Fig. 4. The opening 22 is somewhat larger in diameter than the opening 23 and the two openings are provided with threads. Plugs 24 and 25 are threaded in the openings 22 and 23, respectively, to close the same during use or operation of the device. Heads 26 and 27 are provided on the plugs 24 and 25, respectively and have openings 28 adapted to receive a bar, or the like, to facilitate turning or threading of the plugs. Tapered sealing flanges 29 and 30 are provided on the plugs 24 and 25, respectively, to cooperate with the tapered sealing faces 31 and 32 at the mouths of the openings 22 and 23, respectively. Chains 33 may loosely connect the plugs 24 and 25 with the body 10 to prevent loss or displacement of the plugs.

The turnable member or plug 13 is provided to carry the bean 14 and is operable to close the passage 11 against the flow of fluid when the bean is to be replaced. The plug 13 is a tapered member machined to accurately fit the opening 12 of the body 10. It is preferred to harden the plug 13 and to provide the plug with internal cavities 34 and 35. An opening 36 extends transversely through the plug 14. The opening 36 is longitudinally tapered to carry the bean 14, as will be subsequently described. The plug 13 is turnable between the position illustrated in Fig. 2 where the opening 36 is aligned with the passage 11 and the position illustrated in Fig. 4 where the opening 36 is at right angles to the passage 11 and the plug closes the passage 11 against the flow of fluid. Stop parts 37 are provided on the lower end of the plug 13 and are engageable with a stop pin 39 on the body wall 18 to stop or locate the plug in the two positions just mentioned. The pin 39 may be riveted in an opening in the wall 18. The lower end of the plug 13 is preferably spaced from the body wall 18. A reduced generally cylindrical stem 40 projects from the upper end of the plug 13 and extends through the opening 21 in the body head 19. The stem 40 has a cylindrical base portion 41 of enlarged diameter turnably received in the lower portion of the opening 21. An annular packing assembly 42 is arranged in the opening 21 to seal about the stem 40. The packing assembly 42 may bear upwardly against a shoulder 43 on the wall of the opening 21 and serves to seal between the head 19 and the stem 40. A similar packing means 44 is arranged in a groove in the under side of the head 19 to seal between the head and the internal surface of the body 10. The packing assemblies or packing means 43 and 44 are expanded or actuated by the fluid pressure in the body.

In accordance with the invention the plug 14 is ported so that the fluid pressures on the upper and lower parts of the plug are balanced or substantially balanced. Ports 45 in the upper and lower portions of the plug 13 place the cavities 34 in communication with the upper and lower parts of the body opening 12. The ports 45 and the cavities 34 place the portions of the opening 12 at the upper and lower ends of the plug 13 in communication so that the pressures acting on the upper and lower surfaces of the plug are balanced. This balancing of the pressures makes it easy to turn the plug 13.

It is preferred to provide means for bleeding the fluid pressure from the openings 22 and 23 and from the bean 14 before removing the plugs for the purpose of replacing the bean. A drain port 46 communicates with the opening 22 or 23 and extends through the body wall to the exterior of the body. The port 46 is controlled by a drain valve 47 that may be readily manually operated. When the plug 13 is in the position illustrated in Fig. 4 the bean 14 places the two openings 22 and 23 in communication and opening of the valve 47 bleeds the fluid pressure from both openings as well as the bean.

The bean 14 is carried by the turnable plug 13 to control or restrict the flow of fluid under pressure through the passage 11. The bean 14 is removably or replaceably supported in the opening 36 so that it may be easily and quickly removed when worn. In the preferred form of the invention the bean 14 is an elongate tubular member formed of a hard abrasion resisting material to effectively resist the abrasive action of the solid matter carried by the fluid handled by the device. As illustrated in the drawings the opening 48 in the bean 14 may be quite small in diameter and may be of uniform diameter throughout its length. The external surface of the bean 14 is preferably tapered throughout the length of the bean. The bean 14 is mounted in the opening 36 through the medium of a sleeve 49. The sleeve 49 is a longitudinally tapered tubular member proportioned to accurately fit the tapered opening 36 and to accurately receive the bean 14. It may be preferred to construct the sleeve 49 of a material softer than the material of the plug 13 and softer than the material of the hard bean 14, although the bean 14 and sleeve 49 may both be constructed of steel. The sleeve 49 is subjected to little or no abrasive action and when constructed of a relatively soft material has an effective sealing engagement with the wall of the opening 36 and with the external surface of the bean 14. The parts are related so that the large ends of the bean 14 and the sleeve 49 face the down stream portion of the passage 11, as illustrated in Fig. 2, when the plug 13 is in the normal active position. The sleeve 49 is larger in diameter than the passage 11 and cannot be displaced in the passage. When the bean 14 is to be removed or replaced the plug 13 is turned 90° to the position illustrated in Fig. 4 so that the bean may be easily driven from the sleeve 49 following the removal of the plugs 24 and 25. It will be observed that the plug 13 forms a carrier for the bean 14 that may be turned between the operative position and a position where the bean is easily made accessible for removal.

The means 15 for turning the plug 13 is such that the plug may be easily turned between its two positions when under high fluid pressures and when urged downwardly by the means 16. The plug turning means 15 is in the nature of a gear mechanism. In the preferred construction the means 15 includes a head 50 secured to the stem 40 of the plug 13 and a segment gear or sector gear 51 on the head 50. The head 50 may be fixed to the upper projecting portion of the stem 40 by pins 52 cooperating with the openings or notches in the head and stem. The gear 51 is connected with the head 50 by a plurality of spaced webs 53. The webs 53 may be integral with the head 50 and the gear 51. The webs 53 project downwardly as well as outwardly and support the gear 51 in a plane adjacent the body head 19. The upper surface of the plug head 50 may have a transverse stripe 54 for indicating the rotative position of the plug 13.

The plug turning means 15 further includes a bracket 55 projecting outwardly from the body head 19. The bracket 55 may be an integral part of the head 19. An upstanding arcuate flange 56 is provided on the outer part of the bracket 55 and carries a split bearing ring 57, held in place by a bolt 9. A pinion 58 is carried by the bracket 55 to mesh with the gear 51. A shaft 59 is fixed to the pinion 58 and projects from the upper and lower sides of the pinion. The upper portion of the shaft 59 is rotatably supported by the bearing ring 57 while the lower portion of the shaft is rotatably supported in an opening 60 in the bracket 55. A head 61 is fixed to the upper projecting part of the shaft 59 and has openings 62 for receiving a rod or the like to facilitate turning of the pinion 58. The gear 51 and the pinion 58 may loosely mesh and need not be machined. It will be apparent how rotation of the pinion 58 causes turning of the plug 13. It is to be observed that the gear means 15 has a great mechanical advantage and is operable to positively turn the plug 13.

The means 16 is operable to urge the plug 13 downwardly to have tight sealing engagement with the wall of the tapered opening 12 and is operable to elevate the plug 13 to free the same for easy turning. The means 16 includes a threaded sleeve or nut 63. The nut 63 surrounds the stem 40 below the head 50. The lower portion of the nut 63 is threaded in the opening 21 of the body head 19. In accordance with the invention the threaded nut 63 cooperates with opposed surfaces of the plug 13 and the head 50 to shift the plug vertically when turned or threaded. The lower end of the nut 63 has cooperation with an upwardly facing annular shoulder 64 on the plug stem 40 while an annular upwardly facing shoulder 65 on the nut cooperates with the lower end of the head 50. Spaced outwardly projecting lugs 66 are provided on the upper portion of the nut 63 and have openings 67 for receiving a rod or the like for turning the nut. The turning lugs 66 are below the head 50 but are readily accessible. The nut 63 has openings 75 for admitting the pins 52 to their notches in the stem 40 and the head 50. The pins 52 may be riveted or peened in place. It will be seen that turning of the nut 63 threads the nut up or down relative to the body 10 and that this movement of the nut is transmitted to the plug 13 to elevate or depress the plug.

The means 16 includes a regulable means for expanding or spreading the nut 63 to have its thread bind with the thread of the opening 21 so that the nut is retained in a selected position where it urges the plug 13 downwardly under a given force. The nut 63 is radially split at one side only and has opposing lugs 68 at opposite sides of the split. A spreading screw 69 is threaded through an opening 70 in one lug 68 and its inner end is cooperable with the inner face of the other lug 68 to spread or expand the split nut 63. The spreading screw 69 is positioned so that its head is readily accessible for engagement by a wrench, or the like. It will be seen that inward threading of the screw 69 spreads the nut 63 so that the nut binds in the opening 21 to be held against movement. The nut 63 may be threaded to a selected position and then expanded by means of the screw 69 to be set or locked in this position.

When the device is assembled lubricant is supplied to the opening 12. An opening 71 is provided in the body 10 to communicate with the upper portion of the opening 12 to receive lubricant or grease under pressure from a grease gun, or the like. Following the introduction of the grease the opening 71 is closed by a plug 72. The grease under pressure expands or actuates the packing means or assemblies 43 and 44. The ports 45 and the cavities 34 carry the grease to the lower end of the opening 12 to lubricate the lower part of the plug 13.

In the use or operation of the flow controlling device of this invention the plug 13 may normally be in the position illustrated in Figs. 1, 2 and 3 of the drawings where the bean 14 is aligned with the fluid passage 11. The bean 14 serves to materially restrict the flow of the fluid under pressure through the opening 11. By arranging a rod in an opening 67 and suitably manipulating the rod, the nut 63 may be threaded to a position to urge the plug 13 inwardly to have tight effective sealing engagement with the wall of the tapered opening 12. The nut 63 may be threaded inwardly to assure an effective, dependable sealing cooperation between the plug 13 and the wall of the opening 12 to resist the action of very high fluid pressures. Following the setting of the nut 63 the screw 69 may be threaded inwardly to expand the nut so that it is held or locked in the selected position. The nut 63 may be expanded in such a manner that it remains in the selected position and yet allows turning of the plug 13 by the means 15.

When it becomes necessary or desirable to replace the bean 14 a rod is inserted in the opening 62 to rotate the pinion 58. This, of course, causes turning of the plug 13. The gear means 15 for turning the plug 13 is adapted to develop great force and readily turns the plug even though the nut 63 may urge the plug inwardly under a substantial force. Accordingly, the means 16 may retain the plug 13 in dependable sealing cooperation with the wall of the tapered opening 12 when the plug is to be turned between its two positions by the gear means 15. If desired, the nut 63 may be turned to raise the plug 13 before turning the plug. The gear means 15 may be operated with a minimum of exertion and slowly turns the plug between its two positions. When the plug 13 has been brought to the position illustrated in Fig. 4 of the drawings it serves to completely close off flow through the passage 11 in both directions. With the plug 13 in this closed position the valve 47 may be opened to relieve or bleed the fluid pressure from the openings 22 and 23 and from the bean 14 and the communicating portions of the opening 12. The plugs 24 and 25 may then be removed from the openings 22 and 23. This exposes the opposite ends of the bean 14. The bean 14 may be readily driven from its seat in the sleeve 49 by a drift bar or the like inserted through the small opening 23. A new or replacement bean 14 may be inserted through the large opening 22 and seated in the sleeve 49. The plugs 24 and 25 are then returned to their openings 22 and 23 and the means 15 is operated to return the plug 13 to the operative position illustrated in Figs. 1, 2 and 3.

It is to be observed that the plug turning means 15 and the plug setting means 16 are related to provide for the easy turning of the plug 13 while the plug is maintained in tight dependable sealing engagement with the wall of the tapered body opening 12. This is important as it prevents leakage and the loss of fluid under pressure during replacement of the beans 14. In practice the means 16 may be set and left for an indefinite period in a given condition to retain the plug 13 in tight engagement with the wall of the opening 12 when in operation and while being turned by the means 15 for the purpose of replacing the bean 14.

Having described only a typical preferred form and application of my invention, I do not wish to be limited or restricted to the specific details herein set forth, but wish to reserve to myself any variations or modifications that may appear to those skilled in the art, or fall within the scope of the following claims.

Having described my invention, I claim:

1. A flow controlling device comprising a body having a fluid passage, a tapered opening intersecting the passage and diametrically opposite lateral openings, a tapered plug having a transverse opening and turnable in the tapered opening, a removable bean in the transverse opening of the plug, a stem on the plug, a cap on the body having an opening passing the stem, a head on the stem, cooperating gear elements carried by the cap and the head for turning the plug between the position where the bean is aligned with the passage and a position where the plug closes the passage and the bean is aligned with the lateral openings for removal, a shoulder on the stem opposing the head, a nut threaded in the cap and cooperable with the head and shoulder to raise and lower the plug, the nut being split to be expansible, and a screw reacting between the split portions of the nut to expand the nut so that the nut may be set to urge the plug axially under a selected pressure.

2. A flow controlling device comprising a body having a fluid passage, a tapered opening intersecting the passage and diametrically opposite lateral openings, a tapered plug having a transverse opening and turnable in the tapered opening, a removable bean in the transverse opening of the plug, a stem on the plug, a cap on the body having an opening passing the stem, a head secured to the stem, means associated with the head for turning the plug between the position where the bean is aligned with the passage and a position where the plug closes the passage and the bean is aligned with the lateral openings for removal, said means comprising a sector gear projecting outwardly from the head, a bearing on the cap, and a manually turnable pinion carried by the bearing to mesh with the gear, a shoulder on the stem opposing the head, a nut threaded in the cap and cooperable with the head and shoulder to raise and lower the plug, the nut being split to be expansible, and a screw reacting between the split portions of the nut to expand the nut so that the nut may be set to urge the plug axially under a selected pressure.

3. A flow controlling device comprising a body having a fluid passage and a tapered opening intersecting the passage, a tapered plug turnable in the tapered opening and having a transverse opening adapted to register with the passage, a stem on the plug, a cap on the body having an opening passing the stem, a bracket formed on the cap and projecting laterally therefrom, a head secured to the stem and spaced above the cap, a shoulder on the stem below the head, a nut threaded with the cap and engaging between the head and shoulder to elevate and depress the plug when turned in opposite directions, an operating pinion rotatably supported on the bracket in substantially the same plane as the cap, and a gear rigid with the head and extending downwardly and outwardly therefrom to mesh with the pinion whereby rotation of the pinion turns the plug.

4. A flow controlling device comprising a body having a fluid passage and a tapered opening intersecting the passage, a tapered plug turnable in the tapered opening and having a transverse opening adapted to register with the passage, a stem on the plug, a cap on the body having an opening passing the stem, a bracket formed on the cap and projecting laterally therefrom, a head secured to the stem and spaced above the cap, a shoulder on the stem below the head, a nut threaded with the cap and engaging between the head and shoulder to elevate and depress the plug when turned in opposite directions, an operating pinion rotatably supported on the bracket in substantially the same plane as the cap, an operating part projecting upwardly from the upper end of the pinion engageable to turn the pinion, and a gear secured to the head in substantially the same plane as the operating part and projecting downwardly and outwardly to mesh with the pinion whereby rotation of the pinion turns the plug.

LELAND S. HAMER.